2,810,740
Patented Oct. 22, 1957

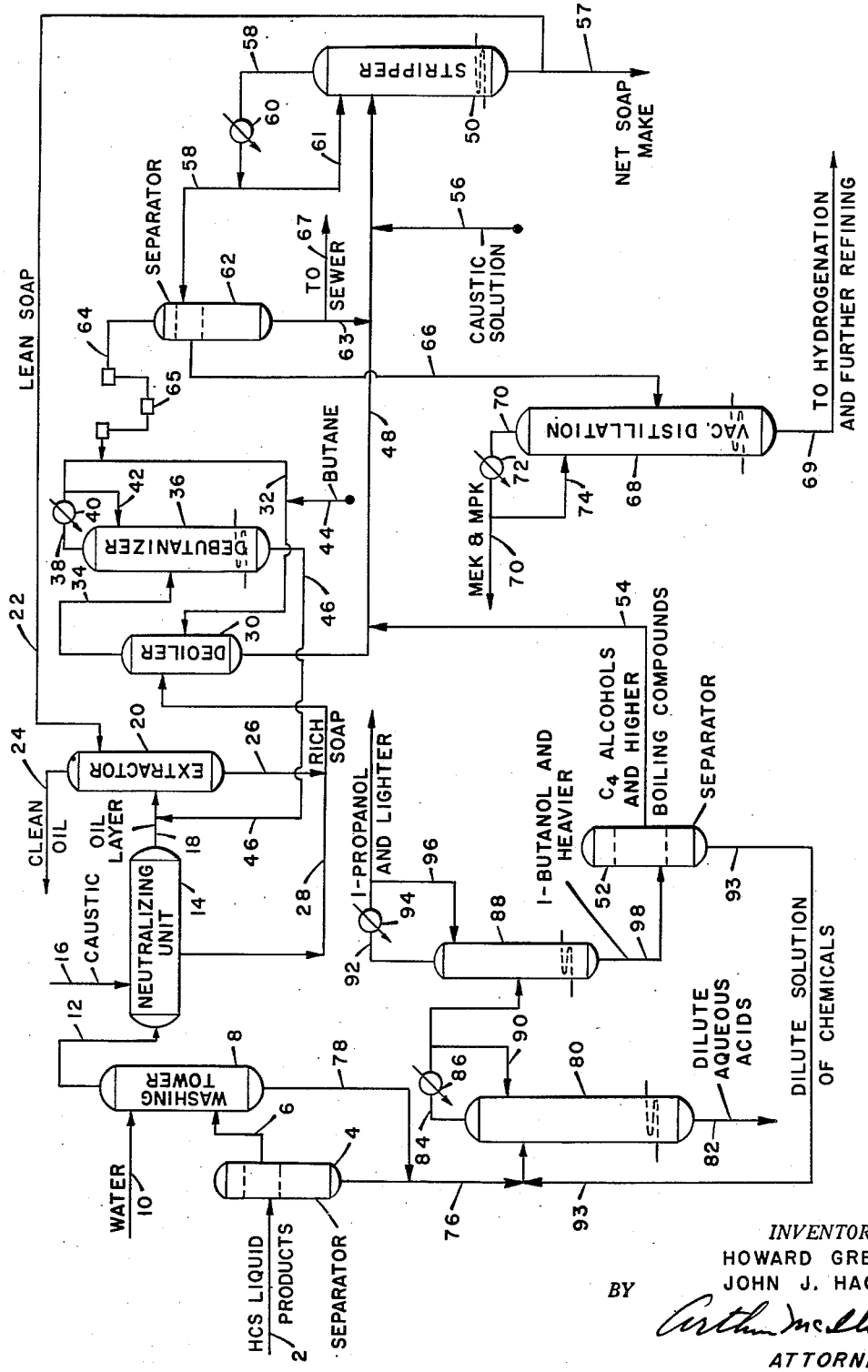

2,810,740

PROCESS FOR PURIFICATION OF OIL- AND WATER-SOLUBLE CHEMICALS

Howard Grekel, Tulsa, Okla., and John J. Hagan, Brownsville, Tex., assignors to Pan American Petroleum Corporation, a corporation of Delaware Application June 13, 1955, Serial No. 514,876

4 Claims. (Cl. 260—450)

The present invention relates to the recovery of oxygenated organic chemicals from both hydrocarbon and aqueous mixtures and to the problems associated therewith. More particularly, it is concerned with an improved over-all procedure for recovering both oil- and water-soluble chemicals involving an integration of separation techniques whereby a reduction in the number of individual separation steps is realized.

While the principles taught herein may find application in the recovery of oil- and water-soluble chemicals from numerous crude aqueous hydrocarbon mixtures thereof, the present description deals primarily with a novel method for solving the problems encountered in recovering valuable chemicals from the water and oil product streams obtained by the hydrogenation of carbon monoxide in the presence of a fluidized alkali-promoted iron or equivalent catalyst under known synthesis conditions. The water and oil fractions produced in the now generally known modification of the Fischer-Tropsch synthesis contain a rather wide variety of chemicals such as acids, ketones, aldehydes and alcohols, together with a relatively small proportion of esters. For instance, in a hydrocarbon plant designed to produce about 6,000 barrels per day of liquid hydrocarbons, there are simultaneously produced about 98,000 pounds of both oil- and water-soluble chemicals. Roughly, about 228,000 pounds of these chemicals are obtained from the oil and about 370,000 pounds of them are recovered from the product water. The distribution of the chemicals in the oil stream breaks down as follows: 76,000 pounds of oil-soluble carbonyl compounds, 61,700 pounds of oil-soluble alcohols, 21,000 pounds of esters, and 69,300 pounds of oil-soluble acids. Owing to their value as chemicals, it is desirable to separate these compounds from the oil stream as completely as possible. Also, in the subsequent conversion of the aforesaid oil fraction into gasoline, it is imperative that such compounds either be removed from the oil or converted into such substances as, for example unsaturated hydrocarbons, which can then be utilized in conjunction with the hydrocarbons originally synthesized to give high quality motor fuels.

In the case of the water-soluble chemicals, from 140,000 to 150,000 pounds per day of aldehydes and ketones are produced, together with about 150,000 pounds of alcohols and about 70,000 pounds of acids.

Prior methods proposed for recovering the aforesaid chemicals from the oil and water streams have generally involved separate treatment of the individual streams. In recovering oil-soluble chemicals from hydrocarbon solutions thereof, such as for example, hydrocarbon solutions of the type produced by the reaction of carbon monoxide with hydrogen at elevated temperatures and pressures in the presence of a fluidized alkali-promoted iron catalyst, it has been proposed that soap solutions of various types be employed as selective solvents or extractants for such chemicals. Generally, these "soap" solutions are not composed of soaps in the true sense, but are made up largely of substantially nonsurface-active salts of alkali metals or their equivalent salts derived from carboxylic acids having an average molecular weight ranging from about 115 to about 155. Soap solutions of this type are most conveniently prepared by adding the required amount of caustic or other suitable base to the primary oil fraction produced in hydrocarbon synthesis whereby the free acids present in said fraction are neutralized. By agitation of the resulting mixture, a substantial portion of the oil-soluble chemicals present therein tend to pass into the lower aqueous layer. Along with the chemicals dissolved in the soap solution, there is usually found from about 5 to 10 weight percent of hydrocarbons solublized therein. The latter, generally speaking, are undesirable because they tend to impart objectionable characteristics to the chemicals recovered from such solutions. Separation of the hydrocarbons from the chemicals has been a relatively difficult job since the former boil over substantially the same range as the chemicals, making ordinary distillation separation methods of very little value.

In practice, primary oil from hydrocarbon synthesis was first mixed with sufficient caustic to neutralize the free acids in the oil, the resulting soaps forming a lower aqueous phase which separated from the neutral oil. The neutral oil was next extracted with a lean soap solution of the type hereinafter defined and the resulting extract which contained oxygenated chemicals and solublized hydrocarbons was combined with the chemical-rich soap solution formed in the abovementioned neutralization step. These combined streams were then subjected to extraction with a light hydrocarbon, hereinafter referred to as "deoiling" or "the deoiling step," such as for example liquid propane or liquid butane, for the purpose of removing from the soap solution any hydrocarbon dissolved by the soap in the neutralization and extraction steps. The raffinate from this extraction consisted chiefly of an oil-free soap solution containing oil-soluble oxygenated organic chemicals and was thereafter fractionated under pressure to separate any light hydrocarbon solvent present, after which the soap solution was stripped free of chemicals in a conventional bubble cap still. The light hydrocarbon extract obtained from the deoiling step contained both higher molecular weight hydrocarbons, e. g., $C_5$ to $C_{10}$ hydrocarbons, and relatively high molecular weight chemicals, particularly ketones and esters, and was generally sent to a flash drum or to a distillation unit where the butane was removed overhead and returned to the deoiling step.

In handling the chemicals in the water stream produced by hydrocarbon synthesis a split was first obtained between the acids and the nonacid compounds. This was accomplished by careful fractionation with the nonacids going overhead and the dilute aqueous acids being withdrawn as bottoms and sent to a separate acid recovery system. The overhead product contained acetaldehyde, propionaldehyde, butyraldehyde, acetone, methyl propyl ketone, methyl ethyl ketone, methyl butyl ketone, isopropyl alcohol, 1 - propanol, ethanol, methanol, 1-butanol, isobutyl alcohol and methyl acetate. To separate this nonacid water-soluble group of chemicals required as many as twenty-eight different fractionating and extraction towers. One phase of the prior procedure which particularly concerns the process of the present invention involved first making a split between the 1-propanol and light components, and the 1-butanol and higher boiling compounds. This latter fraction, i. e., the 1-butanol and higher boiling compounds, was first sent to a caustic scrubber to remove acids from the aforesaid fraction. The scrubbings from this operation were then stripped and the overhead therefrom returned to the aforesaid step making the split between the 1-propanol and lighter and the 1-butanol and higher fractions. The caustic-washed stream from which acids had been removed was then taken to a drying column where the $C_4$ and heavier alcohols were azeotropically dried, using the alcohols themselves as the azeotroping agent. The resulting dry bottoms, consisting principally of isobutyl alcohol and 1-butanol, together with a relatively small amount of $C_5$ alcohols and cyclic $C_5$ and $C_6$ ketones, was sent to a fractionating column operated under conditions such that isobutyl alcohol was obtained in substantially pure form as an overhead. The bottoms fraction resulting from this last-mentioned distillation step was next subjected to further distillation to obtain 1-butanol containing about 5 percent cyclopentanone and a bottoms of the heavier alcohols and ketones mentioned above. Thus, to obtain two relatively pure products from the seven or eight compounds originally present in the 1-butanol and heavier fraction previously referred to, a total of five separate columns was employed.

Accordingly, it is an object of our invention to provide an integrated and efficient procedure for processing both oil-soluble and water-soluble chemicals which involves the utilization of less equipment than has formerly been used in such separation and purification processes. It is a further object of our invention to simplify the procedure of recovering and purifying the oil- and water-soluble chemicals produced in hydrocarbon synthesis.

We have now discovered that the long and involved procedures referred to above for refining the aforesaid oil-soluble and water-soluble chemicals can be materially simplified by adding directly to the stripper processing the rich soap extract previously mentioned the aforesaid bottoms fraction from the water-soluble chemicals separation system consisting of the butanol and higher-boiling compounds. By this procedure, the need for five of the columns previously required in accordance with established methods for effecting the partial separation and purification of this fraction is eliminated. Also, a gain in total acid recovery is realized by neutralization of the acids in said bottoms fraction prior to entry of the latter into the soap stripper. Formerly, such acids were thrown away in the form of a dilute aqueous salt solution.

For a better understanding of the process of our invention, reference is made to the accompanying drawing wherein a mixture of the product oil and water phases produced in hydrocarbon synthesis are transferred through line 2 to a separator 4 where the mixture is allowed to separate into a lower water layer and an upper oil layer. Oil is withdrawn through line 6 and sent to washing tower 8 where it is washed with water introduced at the top of the tower through line 10. The washed oil is then removed through line 12 and sent to a neutralizing unit 14 where it is mixed with a sufficient volume of a 15 to 20 percent caustic solution added through line 16 to neutralize the free acids present in the oil. The resulting neutral oil is then removed through line 18 and sent to extractor 20 where it is countercurrently contacted with a lean 25 to 50 weight percent, preferably a 40 to 50 weight percent, aqueous soap solution supplied by line 22 and derived from a subsequent operation to be discussed in detail below. Oil which is substantially free of chemicals is removed from the extractor through line 24 and sent to further refining. The resulting soap extract is taken from extractor 20 through line 26, combined with rich soap solution in line 28, and sent to deoiling unit 30 where it is washed with a liquid light hydrocarbon, such as butane introduced through line 32, under a pressure of from about 50 to about 60 p. s. i. By this operation, hydrocarbons dissolved in the soap formed in the neutralization step and in the soap used in the extraction step are removed therefrom and taken along with the butane out of the deoiler through line 34. This butane extract, containing higher hydrocarbons and which also contains some high molecular weight chemicals, is sent to debutanizer 36 where the butane is recovered overhead through line 38 and condenser 40, a portion being returned through line 42 as reflux. The debutanizer in this step is usually operated at 50 p. s. i. g. and at a reboiler temperature of about 280° F. The bulk of the butane in line 38 is returned to the deoiling step via line 32. Make-up butane is added to the system through line 44 via line 32. The bottoms from debutanizer 36 which contains relatively high-boiling chemicals and hydrocarbons is returned to the extraction step by means of line 46. Deoiled rich soap is withdrawn from the bottom of deoiling unit 30 through line 48 and sent to stripper 50, together with the oil layer components from separator 52, transferred through line 54, as will be subsequently described in further detail. Prior to the introduction of the deoiled rich soap and the aforesaid oil layer, sufficient 15 to 20 percent aqueous caustic solution is injected through line 56 to neutralize the free acids in the feed to stripper 50. A lean soap stream is withdrawn through line 22 and the bulk thereof recycled to extractor 20. Excess soap over that required in the extraction step is withdrawn from the system through line 57.

An aqueous fraction of oil-soluble chemicals is taken overhead through line 58 and condenser 60, a portion of which is refluxed and the remainder being introduced into separator 62. Uncondensed gas consisting chiefly of butane is transferred from separator 62 through line 64 and compressor 65 to line 32 for subsequent use in the deoiling step. The liquid overhead product in separator 62 consists of an upper organic layer and the lower aqueous layer. The latter may be returned to the system through line 63 with a portion thereof removed therefrom as required through line 67. The organic layer is sent through line 66 to column 68 where further distillation of this product is effected under reduced pressure, usually at about 200 mm. and at a top tower temperature of about 138° F. Under these conditions, a separation of methyl ethyl ketone and methyl propyl ketone from the oil-soluble alcohols is accomplished with the ketones being collected in the overhead product through line 70 and condenser 72. A portion of this distillate is returned through line 74 as reflux, the remainder leaving the system via line 75. The bottoms fraction, consisting chiefly of alcohols and heavier carbonyls, is withdrawn through line 69 and hydrogenated at about 300° F. and at 500 to 700 p. s. i. in the presence of a conventional hydrogenation catalyst. The principal ketones that do not distill over with methyl ethyl ketone and methyl propyl ketone are cyclopentanone and methyl butyl ketone, which on reduction are converted to cyclopentanol and secondary hexyl alcohol, respectively. These alcohols are separated along with 1-pentanol during the subsequent fractionation of the hydrogenated product stream.

The lower aqueous layer in separator 4 is withdrawn through line 76, combined with the washings from tower 8 in line 78 and the combined streams sent to fractionating tower 80, operated at a top tower temperature of about 188° F. (760 mm.). Under these conditions, a separation between the acid and nonacid components is made with the former being withdrawn as a dilute aqueous solution through line 82. The overhead from tower 80 is taken off through line 84, condensed in cooler 86 and the resulting liquid stream sent to a second fractionating tower 88. A portion of the feed in line 84 is returned to tower 80 through line 90 as reflux. Tower 88 is operated at a top tower temperature of about 173° F. (760 mm.) and under these conditions, there is obtained an overhead product through line 92, consisting essentially of 1-propanol and lower boiling compounds. This overhead stream is cooled in condenser 94, a portion thereof returned to tower 88 through line 96 as reflux, and the balance sent to further processing. The bottoms fraction from this operation is withdrawn through line 98 and consists chiefly of 1-butanol and higher boiling chemicals. This stream is sent to separator 52 where it is allowed to form an upper organic layer and a lower aqueous layer. The oil layer is removed through line 54 and combined with the deoiled rich soap in line 48, as previously mentioned. The lower aqueous layer is withdrawn through line 93 and returned to column 80 after being combined with the aqueous feed in line 76, in order to effect further recovery of water-soluble chemicals.

From the foregoing description, it will be apparent that by the process of our invention the recovery and purification of oil-soluble and water-soluble hydrocarbon synthesis chemicals has been materially simplified. Also, in accordance with our invention, it is possible to increase the amount of water-soluble acids recovered owing to the fact that, instead of rejecting from the system the acids present in the organic layer of the 1-butanol and heavier stream, as previously practiced, said layer is combined with the rich deoiled soap stream going to the stripping tower, as pointed out above. Such acids are neutralized by the alkali injected through line 56.

We claim:

1. In a process for the recovery and purification of oxygenated organic chemicals produced in the synthesis of hydrocarbons from carbon monoxide and hydrogen under known conditions to yield a liquid hydrocarbon phase containing oil-soluble oxygenated organic compounds and a liquid water phase containing water-soluble oxygenated organic chemicals, including a 1-propanol and lighter fraction and a 1-butanol and heavier fraction, wherein said oil-soluble compounds are removed from said hydrocarbon phase by extraction with a selective solvent therefor to produce an extract consisting essentially of said solvent and said oil-soluble oxygenated organic compounds and recovering said oil-soluble compounds from said extract by subjecting the latter to a stripping step, the improvement which comprises subjecting said water phase to distillation to obtain an overhead product stream consisting essentially of nonacid water-soluble oxygenated organic chemicals, thereafter subjecting said overhead product stream to further distillation to obtain an overhead product containing 1-propanol and lower boiling compounds and a bottoms product of 1-butanol and higher boiling compounds, and combining said bottoms product with said extract prior to said stripping step.

2. In a process for the recovery and purification of oxygenated organic chemicals produced in the synthesis of hydrocarbons from carbon monoxide and hydrogen under known conditions to yield a liquid hydrocarbon phase containing oil-soluble oxygenated organic compounds and a liquid water phase containing water-soluble oxygenated organic chemicals, including a 1-propanol and lighter fraction and a 1-butanol and heavier fraction, wherein said oil-soluble compounds are removed from said hydrocarbon phase by extraction with a selective solvent therefor to produce an extract consisting essentially of said solvent and said oil-soluble oxygenated organic compounds and recovering said oil-soluble compounds from said extract by subjecting the latter to a stripping step, the improvement which comprises subjecting said water phase to distillation to obtain an overhead product stream consisting essentially of nonacid water-soluble oxygenated organic chemicals, thereafter subjecting said overhead product stream to further distillation to obtain an overhead product containing 1-propanol and lower boiling compounds, collecting an aqueous bottoms fraction and allowing the latter to separate into an upper organic layer and a lower aqueous layer, withdrawing said upper organic layer and combining it with said extract prior to said stripping step.

3. The process of claim 2 in which said lower aqueous layer is returned as feed to the distillation step to which said water phase is subjected.

4. In a process for the recovery and purification of water-soluble and oil-soluble chemicals present, respectively, in an oil phase and in a water phase, said chemicals being of the type produced during synthesis of hydrocarbons by reaction of CO and hydrogen under known conditions and wherein the chemicals in said water phase includes 1-propanol and lower boiling compounds and 1-butanol and higher boiling compounds, the chemicals in said oil phase being removed therefrom by extraction with a selective solvent therefor to produce an extract consisting essentially of said solvent and said oil-soluble chemicals and recovering the latter from said extract by subjecting said extract to a stripping step, the improvement which comprises subjecting said water phase to distillation to obtain an overhead product stream consisting essentially of nonacid water-soluble oxygenated organic chemicals including 1-propanol and lower boiling compounds and 1-butanol and higher boiling compounds, thereafter subjecting said overhead product stream to further distillation to obtain an overhead product containing 1-propanol and lower boiling compounds and a bottoms product of 1-butanol and higher boiling compounds, and combining said bottoms product with said extract prior to said stripping step.

References Cited in the file of this patent

UNITED STATES PATENTS

| Number | Name | Date |
|---|---|---|
| 2,615,912 | Michael | Oct. 28, 1952 |
| 2,645,655 | Pearce | July 14, 1953 |
| 2,696,495 | Cromeans et al. | Dec. 7, 1954 |
| 2,710,829 | Michael | June 14, 1955 |